US008648306B1

(12) United States Patent
Goertz et al.

(10) Patent No.: US 8,648,306 B1
(45) Date of Patent: Feb. 11, 2014

(54) METAMATERIAL DISPERSION

(75) Inventors: Eric D. Goertz, Whitewater, CO (US); Chris F. Williams, Grand Junction, CO (US)

(73) Assignee: Capco, Inc., Grand Junction, CO (US)

(*) Notice: Subject to any disclaimer, the term of this patent is extended or adjusted under 35 U.S.C. 154(b) by 728 days.

(21) Appl. No.: 12/915,674

(22) Filed: Oct. 29, 2010

Related U.S. Application Data

(60) Provisional application No. 61/256,282, filed on Oct. 29, 2009, provisional application No. 61/259,000, filed on Nov. 6, 2009, provisional application No. 61/295,642, filed on Jan. 15, 2010.

(51) Int. Cl.
G02B 27/00 (2006.01)

(52) U.S. Cl.
USPC .......................................... 250/340

(58) Field of Classification Search
USPC .......................................... 250/340
See application file for complete search history.

(56) References Cited

U.S. PATENT DOCUMENTS

| | | | | |
|---|---|---|---|---|
| 3,315,259 | A | * | 4/1967 | Wesch ............................... 342/3 |
| 3,938,151 | A | * | 2/1976 | Trenam ............................ 342/10 |
| 3,992,628 | A | * | 11/1976 | Karney ......................... 250/338.1 |
| 4,030,098 | A | * | 6/1977 | Nahmias ............................ 342/2 |
| 4,600,642 | A | | 7/1986 | Lodge et al. |
| 4,852,453 | A | | 8/1989 | Morin |
| 5,034,274 | A | | 7/1991 | Stevens et al. |
| 5,039,990 | A | | 8/1991 | Stevens et al. |
| 5,081,455 | A | * | 1/1992 | Inui et al. .......................... 342/1 |
| 5,212,488 | A | | 5/1993 | Konotchick |
| 5,214,432 | A | * | 5/1993 | Kasevich et al. .................. 342/3 |
| 5,389,434 | A | | 2/1995 | Chamberlain et al. |
| 5,661,484 | A | | 8/1997 | Shumaker et al. |
| 5,880,692 | A | * | 3/1999 | Stevens et al. ................... 342/12 |
| 5,900,831 | A | | 5/1999 | Eisele et al. |
| 6,043,769 | A | * | 3/2000 | Rowe et al. ........................ 342/4 |
| 6,876,320 | B2 | | 4/2005 | Puente Baliarda |
| 6,986,942 | B1 | * | 1/2006 | Mayes ........................... 428/327 |
| 7,795,596 | B2 | * | 9/2010 | Chowdhury ................... 250/393 |
| 7,826,504 | B2 | * | 11/2010 | Chen et al. .................. 372/43.01 |
| 7,834,799 | B1 | * | 11/2010 | Wells ................................ 342/1 |
| 2007/0190368 | A1 | * | 8/2007 | Jung et al. ...................... 428/919 |
| 2009/0173886 | A1 | * | 7/2009 | Chowdhury ................... 250/393 |
| 2009/0189799 | A1 | | 7/2009 | Ganz et al. |

(Continued)

OTHER PUBLICATIONS

Hu Tao, et al., "Highly-flexible wide angle of incidence terahertz metamaterial absorber," Physical Review B Rapid Communications 78, 241103R (2008), 4 pages.

(Continued)

*Primary Examiner* — David Porta
*Assistant Examiner* — Djura Malevic
(74) *Attorney, Agent, or Firm* — Fish & Richardson P.C.

(57) ABSTRACT

The present disclosure relates to forming a dispersion of metamaterial particles in an atmosphere. The metamaterial particles can be dispersed into the atmosphere, for example, from an aircraft or another type of platform, to form the dispersion. The resulting dispersion can interact with electromagnetic signals in the atmosphere. The particles may strongly interact with both the magnetic and electric field components of the electromagnetic signals. In some implementations, the dispersion absorbs electromagnetic signals in a frequency range. In some implementations, the dispersion modifies electromagnetic signals in a frequency range, for example, by applying a phase shift, a polarization shift, a frequency shift, or a reflection angle to the electromagnetic signals.

43 Claims, 8 Drawing Sheets

(56) References Cited

U.S. PATENT DOCUMENTS

| | | | |
|---|---|---|---|
| 2009/0218523 A1* | 9/2009 | Kare | 250/505.1 |
| 2009/0218524 A1* | 9/2009 | Kare | 250/505.1 |
| 2009/0262766 A1* | 10/2009 | Chen et al. | 372/26 |
| 2010/0149018 A1 | 6/2010 | Umishita et al. | |
| 2011/0287218 A1* | 11/2011 | Narimanov | 428/141 |

OTHER PUBLICATIONS

Electromagnetic Absorbing Chaff, DoD SBIR / STTR, accessed Nov. 10, 2010, 3 pages.

David R. Smith's Metamaterials Site: About Metamaterials, accessed Nov. 6, 2009, 2 pages.

N. Papasimakis, et al. "Coherent and incoherent metamaterials and order-disorder transitions," Physical Review B Rapid Communications 80, 0411023, Jul. 15, 2009, 4 pages.

W. P. Arnott et al., "Droplet size spectra and water-vapor concentration of laboratory water clouds: inversion of Fourier transform infrared (500-5000 cm-1) optical-depth measurement," Applied Optics vol. 36, No. 21, pp. 5205-5216, Jul. 1997.

E. Ekmecki, et al. "A tunable multi-band metamaterial design using micro-split SRR structures," Optics Express, vol. 17, No. 18, pp. 16046-16058, Aug. 2009.

Home page for Professor David R. Smith, "Novel Electromagnetic Materials," Duke University, dated Jan. 16, 2009, 3 pages.

David R. Smith, About Metamaterials—Duke Home Page, "Electromagnetic Metamaterials," dated Jun. 10, 2006, 4 pages.

R Singh, et al., "Terahertz Metamaterial with Asymmetric Transmission," accessed online at: http://arxiv.org/PS_cache/arxiv/pdf/0908/0908.2524v2.pdf, dated Oct. 14, 2009, 5 pages.

E. Goertz and C. Williams, "Metamaterial Applications for Electronic Warfare Expendables; RF to IR," presented by Capco, Inc. to the U.S. Air Force on Jan. 16, 2010, 78 pages.

E. Goertz and C. Williams, "The RF MetaCloud Concept," presented by Capco, Inc. to the U.S. Navy in Dec. 2009, 25 pages.

G.C. Wicks et al., "Microspheres and Microworlds," American Ceramic Society Bulletin, vol. 87, No. 6, pp. 23-28, 2008.

N.I. Landy et al., "A Perfect Metamaterial Absorber," accessed online at: http://arxiv.org/PS_cache/arxiv/pdf/0803/0803.1670v1.pdf, dated Mar. 13, 2008, 6 pages.

H.Y. Chen, et al, "A Novel Microwave Absorbing Structure Using FSS Metamaterial," Progress in Electromagnetics Research Symposium Proceedings, Aug. 18, 2009, 4 pages.

H. Tao, et al., "A Metamaterial Absorber for the Terahertz Regime: Design, fabrication, and characteraization," accessed online at: http://arxiv.org/PS_cache/arxiv/pdf70803/0803.1646v1.pdf, dated Mar. 11, 2008, 8 pages.

* cited by examiner

Dispersion System 202

Command Module 210

Control Module 212

Dispenser Module 214

Cartridges 216

Outgoing Signals 224

Dispersion 220

Atmosphere 218

Incident Signals 222

FIG. 2

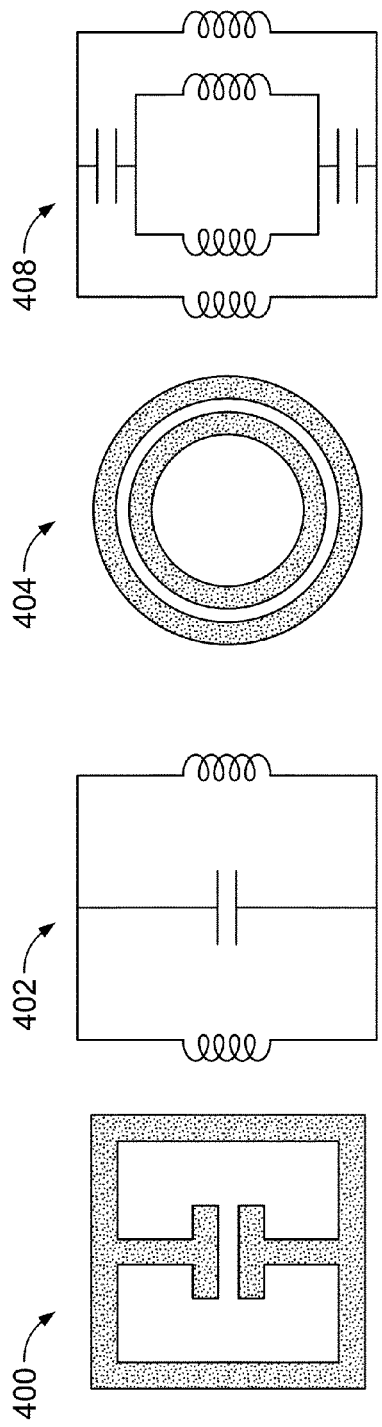
FIG. 4A
FIG. 4B
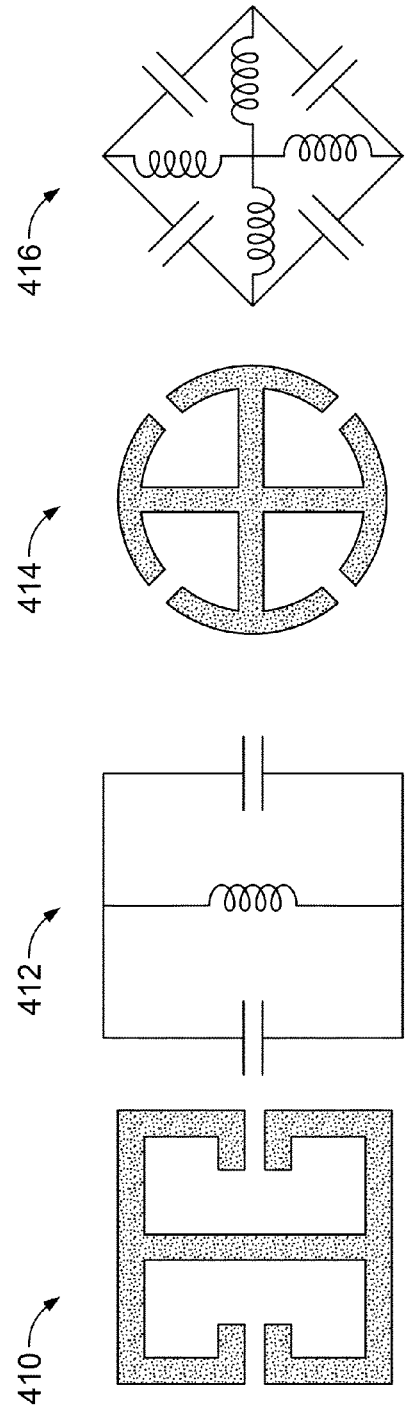
FIG. 4C
FIG. 4D

- 702 Identify Metamaterial Particles
- 704 Dispense Metamaterial Particles into Atmosphere
- 706 Modify Electromagnetic Signals in Atmosphere

METAMATERIAL DISPERSION

CROSS-REFERENCE TO RELATED APPLICATIONS

This application claims the benefit of U.S. Provisional Application No. 61/256,282, entitled "IR Metacloud System," filed on Oct. 29, 2009; U.S. Provisional Application No. 61/259,000, entitled "RF Metamaterial Electronic Attack and Countermeasure System and Method," filed on Nov. 6, 2009; and U.S. Provisional Application No. 61/295,642, entitled "Metamaterials Interacting with Electromagnetic Fields," filed on Jan. 15, 2010. The entire disclosure of all three priority applications is hereby incorporated by reference for all purposes.

TECHNICAL FIELD

The present disclosure generally relates to a dispersion of metamaterial elements, for example, a metamaterial-based chaff or obscurant.

BACKGROUND

Corridor chaffing has been used to obscure the radar signatures of aircraft since WWII. For example, military aircraft can scatter chaff strands in an airspace to form a cloud that interferes with the electromagnetic signals of a radar system. In this manner, the conventional chaff system can function as an electronic countermeasure. The chaff can be deployed, for example, in a slip-stream of the aircraft, by a rocket, or in a different manner. Conventional chaff clouds, made up of reflective dipole strands, typically produce a large radar cross section that can be readily detected and identified. Detecting the existence of a chaff corridor alerts the radar site to the coordinates of the chaff cloud and indicates the existence of aircraft in the airspace, thereby reducing the effectiveness of the obscurant.

SUMMARY

In a general aspect, metamaterial particles can be dispersed in an atmosphere. The dispersion can absorb electromagnetic signals in the atmosphere and/or apply predefined modifications to electromagnetic signals in the atmosphere.

In some aspects, a system includes a carrier element and a dispenser element. The carrier element includes multiple metamaterial particles. Each metamaterial particle may interact strongly with a magnetic component and an electric component of an electromagnetic signal. Each metamaterial particle may be designed to absorb the electromagnetic signal, to reflect the electromagnetic signal at a predefined angle, and/or to apply a predefined phase shift, polarization shift, frequency shift, or other modification to the electromagnetic signal. The dispenser forms a dispersion of the metamaterial particles in an atmosphere by dispensing the metamaterials particles into the atmosphere. The dispersion may absorb electromagnetic signals, reflect electromagnetic signals at the predefined angle, and/or to apply to the electromagnetic signals the predefined phase shift, polarization shift, frequency shift, or other modification.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a diagram of an example metamaterial dispersion system.

FIGS. 4A, 4B, 4C, and 4D are diagrams of example metamaterial particles.

FIG. 6 is a diagram of an example metamaterial particle.

FIG. 7 is a flow chart showing an example technique for using a dispersion of metamaterial particles to modify electromagnetic signals.

Like reference numbers in the drawings indicate like elements.

DETAILED DESCRIPTION

Figure 1A:
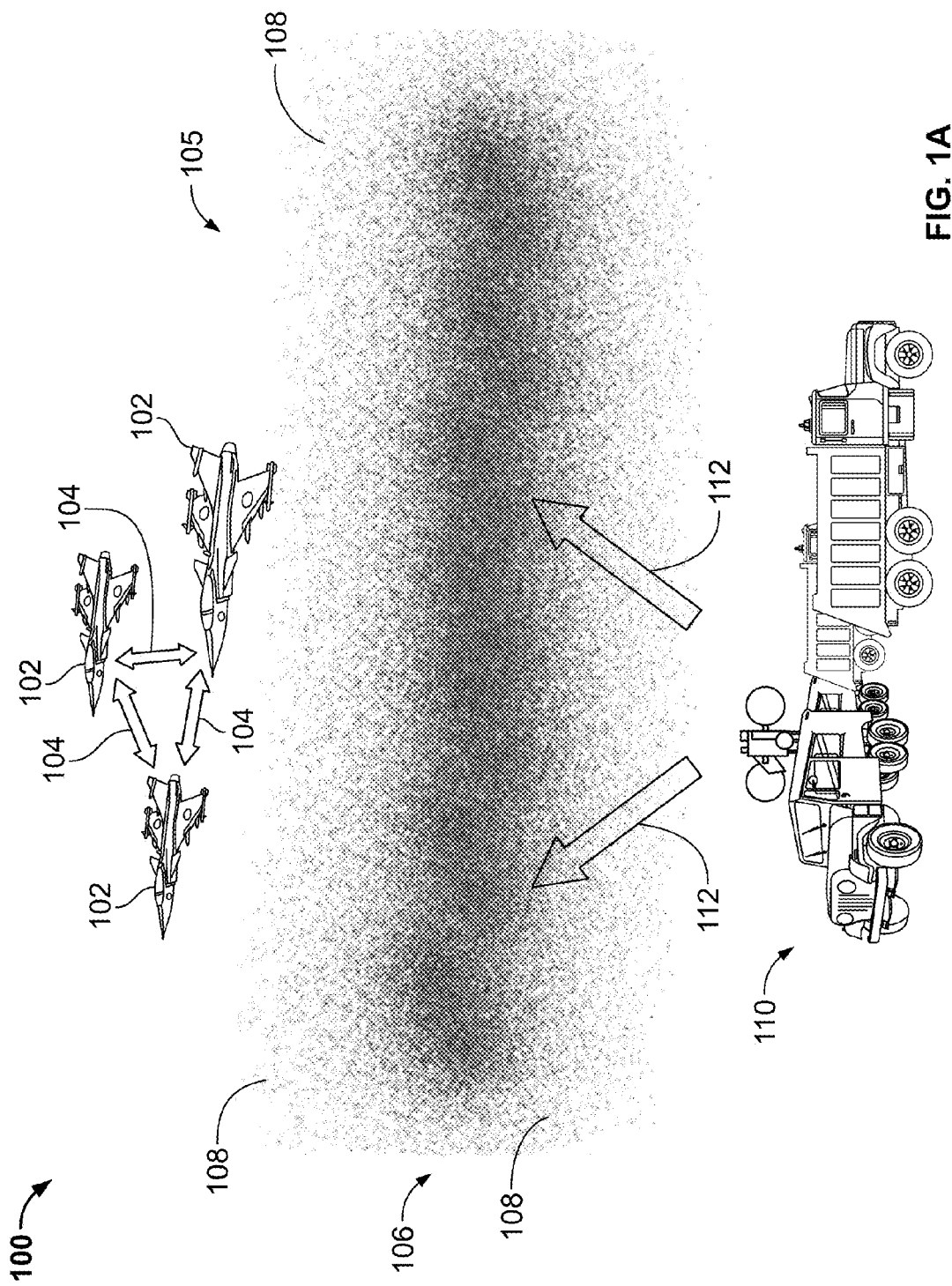
FIGS. 1A and 1B are diagrams of example systems in which dispersions of metamaterial particles interact with electromagnetic signals.
Figure 1B:
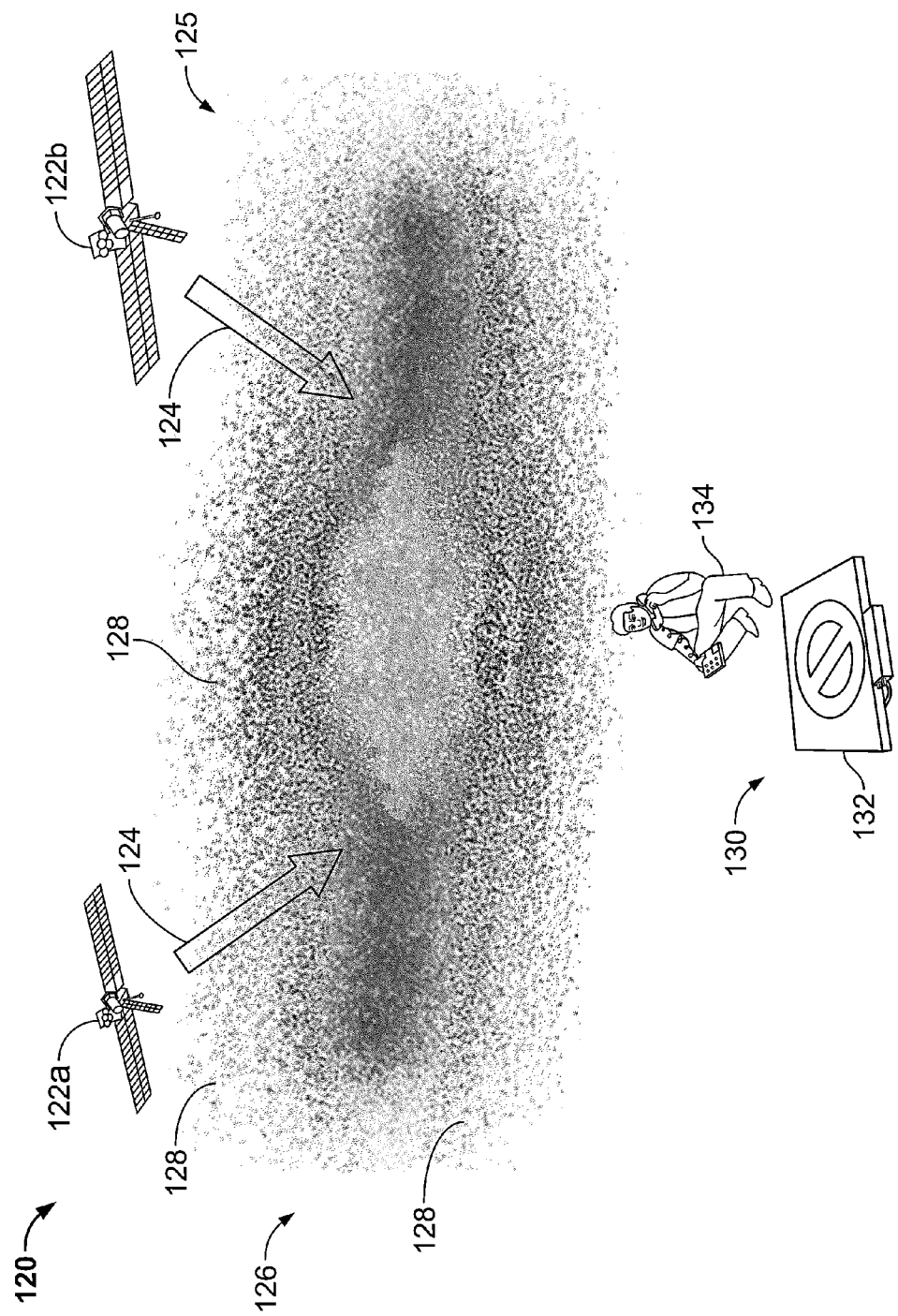

FIGS. 1A and 1B are diagrams of example systems 100 and 120 that interact with electromagnetic (EM) signals using a dispersion of metamaterial particles. For example, the systems 100, 120 may include a dispersion of metamaterial particles that attenuate, reflect, transmit, and/or otherwise modify incident EM signals in a predefined manner. In the examples shown in FIGS. 1A and 1B, EM signals in an airspace are absorbed by an airborne distribution of dispersed, lightweight, absorptive metamaterial particles. In some implementations, in addition to or instead of absorbing the EM signals, the dispersion of metamaterial particles may apply a predefined modification to the EM signals in the airspace. As such, while the discussion with respect to FIGS. 1A and 1B describes absorption of EM signals, metamaterials may be designed to interact with an EM field in another manner. For example, metamaterials may be designed to modify the phase, polarization, frequency, propagation vector, and/or other properties of EM signals. These implementations are discussed in more detail with respect to FIG. 2. Moreover, while certain example frequency ranges are discussed with respect to some example implementations, a dispersion of metamaterial particles may interact with additional and/or different frequency ranges. For example, in some implementations, a dispersion of metamaterial particles may interact with electromagnetic signals in the ultraviolet (UV) frequency range between 750 Terahertz (THz) and 30 Petahertz (PHz), in the visible frequency range between 400 THz and 750 THz, in the infrared (IR) frequency range between 1 THz and 400 THz, in the millimeter-wave (MMW) frequency range between 30 Gigahertz (GHz) and 1 THz, in the microwave frequency range between 300 Megahertz (MHz) and 30 GHz, in the radio frequency range between 1 MHz and 300 MHz, and/or other frequencies. As such, in some implementations, a dispersion of metamaterial particles may be used to replace and/or improve a conventional chaff cloud, a conventional obscurant, and/or other types of conventional systems.

In general, metamaterials can be designed to attenuate, reflect, transmit, and/or otherwise modify incident EM signals in a predefined manner. In some cases, metamaterial particles can be designed to form a dispersion that interacts with EM signals in a wide range of frequencies, a dispersion that strongly interacts with both the electric and magnetic components of EM fields, and/or a dispersion that modifies EM signals in a particular predetermined manner. The interaction with the magnetic component may be strong, for example, relative to a conventional dipole chaff element. In some applications, a dispersion of metamaterials particles acts as a barrier to incident EM radiation. For example, metamaterial particles dispersed in an atmosphere can form a localized macrostructure that absorbs incident EM signals in the atmosphere. In this manner, the dispersion of particles can attenuate or substantially eliminate a band of incident EM signals. In some applications, a dispersion of metamaterial particles acts as an EM signal modifier. The localized macrostructure of metamaterial particles may modify the properties of EM signals in a predetermined manner, for example, shifting the polarization, frequency, phase, propagation angle, and/or other properties of incident EM signals.

Metamaterial particles may interact with both the electric and magnetic components of an incident electromagnetic signal. For example, a metamaterial particle may include a conductor and/or dielectric geometry that strongly couples to the magnetic component of the EM signal and a conductor and/or dielectric geometry that strongly couples to the electric component of the EM signal. In some instances, a metamaterial particle strongly interacts with the electric and magnetic components of an incident EM signal by generating electric and magnetic responses that are comparable in magnitude to the incident EM signal. For example, in a concentric ring resonator (CRR) structure, the conductive ring and dielectric structure may couple strongly to the magnetic component and electric component of an EM signal. For the magnetic interaction, in some implementations, the magnetic component of an incident EM signal induces rotating currents in one or more of the conductive rings of the CRR structure, and the induced rotating current in the conductive rings may produce a magnetic field comparable in magnitude to the magnetic field component of the incident EM signal. The magnetic field produced by the conductive ring may increase, decrease, or otherwise modify the total magnetic component of the EM signal. For the electric interaction, in some implementations, the electric component of the incident EM signal may induce electric fields across the capacitive features of the CRR structure (e.g., across the dielectric between the conductive rings), and the induced electric fields may be comparable in magnitude to the incident electric field. The induced electric fields in the CRR structure may increase, decrease, or otherwise modify the total electric component of the EM signal. In addition to CRR structures, other types of metamaterial particles can interact strongly with both the electric and magnetic components of an incident electromagnetic signal A dispersion of metamaterial particles may include hundreds, thousands, millions, or more particles in an airborne distribution, a waterborne distribution, a spaceborne distribution, or a combination of one or more of these. In some implementations, the particles may include materials with negative electric permittivity, materials with zero electric permittivity, materials with negative magnetic permeability, materials with zero magnetic permeability, materials with zero index of refraction, materials with positive index of refraction, and/or materials with negative index of refraction. In some implementations, the particles may include metallic inclusions, pyroelectric materials, pyrophoric materials, ferroelectric materials, semiconductors, lanthanide series elements (e.g., holmium or terbium), quantum dots, organic dyes, carbon nanotubes, and/or graphene sheets. In some implementations, the interaction between the dispersion and the EM radiation may result in absorption of the EM radiation, scattering of the EM radiation, amplification of the EM radiation, Doppler shifting of the EM radiation, phase shifting of the EM radiation, and/or frequency shifting of the EM radiation. In some implementations, the particles may interact with UV frequencies, visible frequencies, infrared frequencies, millimeter-wave frequencies, microwave frequencies, and/or radio frequencies. In some implementations, the dispersion of particles may be used for electronic warfare applications, denial-of-service applications, shipboard countermeasure applications, airborne expendable countermeasure applications, and/or battlefield obscuration.

In the absorption application shown in FIG. 1A, metamaterial particles 108 may be dispersed in an airspace 105 above a geographic area to form a dispersion 106. Radar pulses 112 transmitted into the airspace 105 from radar systems 110 may be substantially absorbed by the dispersion 106, allowing aircraft 102 to fly above the dispersion 106 without detection, or otherwise with a reduced likelihood of detection by the radar systems 110 in the geographic area below the dispersion 106. In the example shown in FIG. 1A, the dispersion 106 may be highly absorptive (and thus, non-reflective). Thus, the dispersion 106 in FIG. 1A may not reflect a detectable characteristic return signal, but instead, the dispersion 106 may absorb substantially all incident radar pulses 112 from the radar systems 110. Eliminating or reducing the characteristic scattering from the dispersion 106 in this manner may greatly enhance the obscuration effectiveness relative to conventional chaff or non-metamaterial chaff. For example, the highly absorptive dispersion 106 may allow the aircraft 102 to move through the airspace 105 with a lower likelihood of being detected by radar systems. In the example shown in FIG. 1A, the dispersion 106 may not significantly obscure communications among the aircraft 102. Thus, in the example shown, the aircraft 102 may communicate with each other by EM signals 104 above the dispersion 106.

In some aspects of operation, one or more of the aircraft 102 dispenses the metamaterial particles 108 into the airspace 105. The dispensed metamaterial particles 108 disperse in the airspace 105 forming the dispersion 106 generally in a region above the radar systems 110. The radar systems 110 transmit radar pulses 112, including pulses that propagate toward the airspace 105. For example, the radar pulses 112 may include one or more radio frequency pulses transmitted continuously or at regular intervals. The radar systems 110 monitor the airspace 105 for reflected signals in order to detect the presence of objects in the airspace. For example, in some instances (not shown), the radar pulses 112 may impinge an object in the airspace 105, and the radar systems 110 may detect the presence of such objects based on reflected signals. As shown in FIG. 1A, the dispersion 106 absorbs substantially all of the radar pulses 112 before the radar pulses 112 reach the aircraft 102, and therefore the radar pulses 112 have little or no direct interaction with the aircraft 102. As such, dispersion 106 prevents or reduces the likelihood of the radar systems 110 detecting the aircraft 102 based on reflected EM signals.

In the example system 120 shown in FIG. 1B, absorptive metamaterial particles 128 form a dispersion 126 in the airspace 125 above communications equipment 130, and communication signals 124 from satellite systems 122 are blocked by the dispersion 126. Thus, in the example system 120 shown, the ground communication systems 130 have limited or no communication with the satellite systems 122. In particular, the telecommunications equipment 134, global positioning system (GPS) equipment 132, and/or other types of systems that rely on EM communication may be rendered substantially inoperable, at least temporarily, by the presence of the dispersion 126. In this manner, a metamaterial-based dispersion between communication nodes may silence communication channels. The expanded use of electronic warfare and electronic attack in ground operations has created a need for low-cost solutions that are capable of denying service to enemy communications equipment. The ability to temporarily deny or substantially deny a geographic region the use of wireless communication without damaging expensive and valuable infrastructure may result in a lower cost and less disruption to the livelihood of the local population.

In some aspects of operation, a person, vehicle, aircraft, ground system, and/or another type of deployment platform dispenses the metamaterial particles 128 into the airspace 125. The dispensed metamaterial particles 128 disperse in the airspace 125 forming the dispersion 126 generally in a region above the ground communication systems 130. The ground communication systems 130 may transmit signals, including signals that propagate into the airspace 125, and/or the satellite systems 122 may transmit signals 124, including signals that propagate into the airspace 125. For example, the telecommunications equipment 134 and/or the GPS equipment 132 may be designed to operate based on wireless interactions with the satellite systems 122. In FIG. 1B, the dispersion 126 absorbs substantially all of the incident EM signals transmitted into the dispersion 126 from the telecommunications equipment 134, the GPS equipment 132, and/or the satellite systems 122. As such, dispersion 126 prevents or reduces the likelihood of successful communication between the telecommunications equipment 134 and the satellite systems 122 and between the GPS equipment 132 and the satellite systems 122. In some implementations, the dispersion 126 prevents or reduces the likelihood of successful communication between a land-based antenna (e.g., nodes of a cellular network) or another land-based system and the ground communication systems 130.

FIG. 2 is a diagram of an example metamaterial dispersion system 202 that can be used to form a dispersion 220 of metamaterial particles in an atmosphere 218. Generally, any suitable type of countermeasure dispenser system may be used to dispense metamaterial particles into the atmosphere 218 to form the dispersion 220. For example, in some implementations, the metamaterial particles are dispensed from an aircraft, a grenade, a bomblet and/or another type of platform or device. In some implementations, a conventional countermeasure dispenser system designed to dispense conventional countermeasures can be adapted to dispense metamaterial particles to form a dispersion of metamaterial particles. For example, conventional obscurant grenades could be adapted to dispense metamaterial particles rather than conventional obscurant materials. Grenades may be deployed by hand, by a grenade launcher, by a grenade rifle, and/or by another type of grenade deployment platform. Examples of conventional obscurant grenades include the Fast Obscurant Grenade (FOG), the XM106 Grenade, vehicle-launched grenades such as the Light Vehicle Obscurant Smoke System (LVOSS) dispensed M90, and others. As another example, conventional countermeasures dispenser systems (the ALE-47 Airborne Countermeasures Dispenser System developed for the U.S. military by BAE Systems, and/or others) could be adapted to dispense cartridges filled with metamaterial particles rather than conventional countermeasures. The ALE-47 is one example of a conventional platform protection system that analyzes threats in the theater of operation and automatically dispenses conventional countermeasures (e.g., dipole chaff, flares) in response to radar-guided and/or infrared-seeking threats. Alternatively or additionally, different types of systems may be used.

As shown in FIG. 2, the example metamaterial dispersion system 202 may be associated with a stationary or mobile deployment platform 200. For example, the metamaterial dispersion system 202 may be incorporated into an airborne, landborne, spaceborne, waterborne, portable, or other type of deployment platform 200. Some examples of a deployment platforms 200 include an aircraft (e.g., cargo plane, helicopter, fighter jet, etc.), water vessel, submarine vessel, spacecraft, satellite, land vehicle (e.g., tank, truck, etc.), stationary system (e.g., a defense installation, etc.) and other types of platforms. The deployment platform 200 may include civilian, military, and/or other classes of manned and/or unmanned systems. In some instances, the metamaterial dispersion system 202 may be implemented as a standalone system that is transported and/or housed by the deployment platform 200. In some instances, the metamaterial dispersion system 202 may be fully or partially integrated with electrical, mechanical and/or other aspects of the deployment platform 200.

At a high level, the example metamaterial dispersion system 202 shown in FIG. 2 includes a command module 210, a control module 212, and a dispenser module 214. In some instances, one or more of the command module 210, the control module 212, and the dispenser module 214 may be omitted and/or integrated with other modules, components, or devices. In some instances, one or more of the command module 210, the control module 212, and the dispenser module 214 may be implemented as multiple separate modules, components, or devices.

The command module 210 can include any software, hardware, and/or firmware configured to receive and/or process data relating to operation of the metamaterial dispersion system 202. The command module 210 may include computing devices, software, circuitry, displays, interfaces, and/or other components, as appropriate. The command module 210 may receive and processes commands from a human interface and/or from an automated system. For example, the command module 210 may include a graphical user interface, electronic controller devices, mechanical controller devices, and/or other types of controllers that receive human input; and/or the command module 210 may include a data interface that receives commands from data communication, data processing and/or data storage devices. The command module 210 may include a cockpit control unit that includes switches, controls, indicators, etc. In some implementations, a user of the metamaterial dispersion system 202 (e.g., an operator or crew member of an aircraft or another type of deployment platform) directly interfaces with the command module 210 to instruct the metamaterial dispersion system 202 to generate a dispersion. Commands from the command module 210 may be communicated to the control module 212.

The control module 212 can include any software, hardware, and/or firmware configured to interact with the dispenser module 214 based on data received from the command module 210. The control module 212 may operate the dispenser module 214 to dispense the contents of the cartridges 216 into the atmosphere 218. The control module 212 may include electronic circuitry (e.g., capacitors, inductors, resistors, digital logic gates, etc.), digital controllers, and/or microprocessors configured to control operation (e.g., movement, configuration, etc.) of a component part of the dispersions system 202. For example, digital logic elements, digital controllers, microprocessors, and/or analog circuitry in the control module 212 may be configured to operate switches, motors, valves, servos, actuators, or other components of the dispenser module 214. Control signals, which may include digital and/or analog control signals, may be generated at the control module 212 in response to commands from the command module 210. The switches, motors, valves, servos, actuators, and/or other components of the dispenser module 214 may be actuated based on the control signals generated at the control module 212. For example, a mechanical actuator of the dispenser module 214 may be adapted to initiate one or more of the cartridges 216 based on control signals received from the control module 212. The control module 212 may be adapted to identify a particular cartridge 216 and/or multiple cartridges 216 to be deployed by the dispenser module 214.

In some implementations, the dispenser module 214 carries one or more cartridges 216. The dispenser module 214 may be configured to activate, open, release, deploy, drop, or otherwise actuate each of the cartridges 216 based on control signals received from the control module 212. Each cartridge 216 contains metamaterial particles that can form a dispersion 220 in the atmosphere 218. Each cartridge 216 may include a metal, plastic, composite, or other type of sleeve or canister that contains hundreds, thousands, millions, or more metamaterial particles. Example metamaterial particles are shown in FIGS. 4A, 4B, 4C, 4D, 5A, 5B, 6, and 8. Each cartridge may include a single type of metamaterial particles, multiple different types of metamaterial particles, and/or other materials.

A cartridge 216 may release its contents into the atmosphere 218 after the cartridge 216 is launched, released, dropped, propelled, or otherwise introduced into the atmosphere 218. Additionally or alternatively, the cartridge 216 may remain fixed in dispenser module 214 and release its contents directly into the atmosphere 218 from the fixed position in dispenser module 214. In an example aspect of operation, the command module 210 instructs the control module 212 to dispense the contents of one or more cartridges 216 at particular time, a particular location, and/or in association with another type of criterion. In response, the control module 212 identifies one or more of the cartridges 216 and transmits signals to the dispenser module 214. In response to the signals from the control module 212, the dispenser module 214 actuates the identified cartridges 216.

The metamaterial particles can be dispersed from one or more of the cartridges 216 into the atmosphere 218 to form the dispersion 220. Example dispersions are shown in FIGS. 3A and 3B. The dispersion 220 can substantially or partially absorb incident EM signals 222 in the atmosphere 218, and/or the dispersion 220 can generate outgoing signals 224 in the atmosphere 218 by modifying the incident EM signals 222 in accordance with one or more predefined parameters (e.g., phase, frequency, etc.). The particular features and modules of the metamaterial dispersion system 202 are described and shown schematically in FIG. 2A by way of example; different types of metamaterial dispersions, which may have the same, different, fewer, and/or additional features and components, may be used. For example, in some cases, one or more of the components shown in FIG. 2 may be combined with other components or separated into multiple different components.

The atmosphere 218 in which the dispersion 220 is formed may be proximate to and/or remote from the deployment platform 200. For example, the dispersion 220 may be formed in the immediate vicinity of the vehicle or installation that deploys the dispersion 220, and/or the dispersion 220 may be formed in a remote location. The atmosphere 218 may include a volume of the Earth's atmosphere, for example, above a specified geographic region or area. For example, the dispersion 220 in the Earth's atmosphere may be used by an aircraft as a countermeasure against radar detection, against UV, visible, infrared, millimeter wave and/or microwave guided missiles, and/or against other types of threats. As another example, the dispersion in the Earth's atmosphere may be used to interrupt signals transmitted by or to communication and/or positioning equipment. The atmosphere 218 may include a region of outer space, i.e., outside of or within the outer regions of the Earth's atmosphere. For example, the dispersion 220 may be used to interfere with satellite communications, celestial signals, and/or other types of EM fields in outer space. The atmosphere 218 may include a volume of liquid, such as an ocean, lake, reservoir, or any other body of water. For example, the dispersion 220 in a body of water can be used by a submarine as a countermeasure against radar detection, torpedoes, and/or other types of threats.

The dispersion 220 includes a dispersion of metamaterial particles. The dispersion may be a suspension or another type of heterogeneous mixture of the metamaterial particles in the atmospheric medium. The dispersion 220 may be a localized macrostructure, for example, spanning dimensions of tens, hundreds, or thousands of meters. The dispersion 220 may be a transient macrostructure, for example, staying aloft in the atmosphere 218 for minutes, hours, or days. The duration of the dispersion 220 may depend on the properties of the metamaterial particles as well as gravitational, thermodynamic, and other conditions of the atmosphere 218. In addition to metamaterial particles, the dispersion 220 may include other types of elements. For example, the metamaterial particles may be combined with dipole strands, fibers, smoke, and/or other types of chaff or obscurant. The electromagnetic properties of the dispersion 220 may be based on the electromagnetic properties of the individual metamaterial particles, the particle density of the metamaterial particles, the thermodynamic properties of the local atmosphere 218 (e.g., temperature, humidity, pressure, etc.), and/or other factors. Absorption efficiency may be described in terms of the volume filling ratio. For example, a dispersion of 5 μm diameter concentric shell resonators (CSRs) (an example CSR structure is shown in FIG. 8) with a uniform filling ratio of 0.0005% may have a 94% absorption efficiency inside a volume of 50 cubic meters. As another example, a dispersion of 1 mm diameter CSRs with a uniform filling ratio of 0.01% may have a 94% absorption efficiency inside a volume of 100,000 cubic meters.

At a high level, the dispersion 220 may include metamaterial-based elements that interact with the electric and/or magnetic components of the incident EM signals 222 to achieve a desired effect. For example, the dispersion 220 may be designed to achieve absorption and/or transmission over a particular frequency range (e.g., high-pass, low-pass, or band-pass filtering), reflection at a particular angle, polarization shifting, frequency shifting, phase shifting, and/or other effects. In some implementations, the dispersion 220 can reflect, absorb, scatter, or refract EM signals, which may include radio frequency, infrared, microwave, and/or EM signals in other ranges. In some instances, the dispersion 220 may include broadband absorbing metamaterial particles that are lightweight, compact and have the ability to stay aloft in the atmosphere 218. Metamaterial particles can be highly geometry dependent, having a specific resonant frequency (or frequencies) that is (are) absorptive.

The dispersion 220 may be adapted to interact with EM signals generated by a radar system, a missile system, a communication system, a directed energy weapon, and/or other types of systems. The dispersion 220 may be used in a variety of ways to manage the density of EM signals in a frequency range, to maintain control of a communication space, and/or for other purposes. For example, the dispersion 220 may be used as a passive airborne electronic attack, a guided missile countermeasure, an electromagnetic band filter, a broad band absorber, and/or in another manner. As a particular example, the dispersion 220 may act as a countermeasure against radar detection and/or missile seeker heads, for example, missile seeker heads that utilize millimeter wave technology, radio frequency technology, infrared technology, and/or others. As another particular example, the dispersion 220 may absorb EM signals to silence cellular, satellite, GPS and/or types of communication signals.

Some metamaterial particles, such as the examples represented in FIGS. 4A, 4B, 4C, and 4D, and other examples can be manufactured by micro- and nano-fabrication techniques. Generally, fabrication techniques that may be used to manufacture metamaterials are well know. For example, lithography, etching, and deposition techniques can be used to manufacture many types of metamaterial particles from base materials, such as conductors, semiconductors, insulators, dielectrics, and/or other types of materials. Example dielectric materials include glass, silicon dioxide, barium titanate and others. Example conductive material include palladium, copper, gold, silver, and others. Additional and/or different materials may be used. Metamaterial particles may be manufactured on different size scales, depending on the desired properties. In some instances, the largest dimension of each metamaterial particle can be less than 10 micrometers, greater than 1 centimeter, or between the micrometer and centimeter size scales. Size reduction of the elements can be achieved by incorporating high-permittivity materials into the dielectric substrate.

In some instances, the manufacturing process and/or the materials, tools, recipes and/or parameters of the manufacturing process may be selected or adjusted to create metamaterial particles that have predefined interactions with electromagnetic signals. In some implementations, the dimensions of the metamaterial particles may be designed so that the particles strongly interact with a certain frequency or range of frequencies. For example, a particle may be designed with conductive elements having lengths on the order of millimeters, micrometers, nanometers, or another length scale to interact with EM signals having wavelengths on the same scale. In some instances, a conductor may interact strongly with EM signals having a wavelength that is two-times, four-times (or another multiple of) the length of the conductor. In some implementations, the geometry of the metamaterial particles may be designed to effect a particular phase shift, polarization shift, frequency shift, or reflection angle. For example, the relative spacing, thickness, orientation, and/or shape of conductive and dielectric elements may be designed so that the particles modify incident EM signals in a predefined manner. In some implementations, the structure of the metamaterial may be designed to interact with both the electric and magnetic field components of an EM signal. For example, a first layer or component of the metamaterial particle may be designed so that it interacts strongly with an electric field component, another layer or component of the metamaterial particle may be designed so that it interacts strongly with a magnetic field component.

As for absorption, the dispersion 220 can absorb the incident signals 222 in some implementations. In such cases, there may be substantially no outgoing signals 224, or the outgoing signals 224 may be substantially attenuated with respect to the incident signals 222. For example, in some cases, the dispersion 220 may absorb up to 94% of the EM signals that impinge the dispersion 220. The absorbed signals may include signal frequencies in the radio frequency to infrared frequency range. A signal-absorbing dispersion may be useful in a variety of applications. For example, absorbing radar signals may help aircraft avoid detection in an enemy airspace. As another example, absorbing communication signals may help clear communication channels in an emergency. Metamaterial particles that can be used for absorption applications include the planar electric metamaterial elements with the inclusion of a metalized layer. Example planar electric metamaterial elements are shown in FIGS. 4A, 4B, 4C, and 4D. As illustrated by the analogous electric circuits in FIGS. 4A, 4B, 4C, and 4D, the absorption frequencies can be adjusted by altering the lengths of the inductive rings and the capacitive coupling between them.

As for phase shifting, the dispersion 220 can modify, in some implementations, the incident signals 222 by applying a predefined phase shift to the incident signals 222. In such cases, the outgoing signals 224 may be phase shifted by a predetermined phase $\phi$ with respect to the incident signals 222. Thus, for example, incident signals having a first phase $\phi_1$ may be modified to outgoing signals having a second phase $\phi_2$, where $\phi_1-\phi=\phi_2$. The phase shifted outgoing signals 224 may have substantially the same amplitude, frequency, polarization, and/or propagation vector as the incident signals 222. An example of a metamaterial particle that can be used for phase shifting is the concentric ring structure shown in FIG. 4B. The bandwidth and quality factor of the phase shift may be determined by the capacitive coupling of the inner and outer rings. The resonant frequency may be determined by the radii of the inner and outer rings and the dielectric permittivity of the substrate.

As for frequency shifting, the dispersion 220 can modify, in some implementations, the incident signals 222 by applying a predefined frequency shift to the incident signals 222. In such cases, the outgoing signals 224 may be frequency shifted by a predetermined frequency $\omega$ with respect to the incident signals 222. Thus, for example, incident signals having a first frequency $\omega_1$ may be modified to outgoing signals having a second frequency $\omega_2$, where $\omega_1-\omega=\omega_2$. The phase shifted outgoing signals 224 may have substantially the same amplitude, phase, polarization, and/or propagation vector as the incident signals 222.

As for polarization shifting, the dispersion 220 can modify, in some implementations, the incident signals 222 by applying a predefined polarization shift to the incident signals 222. In such cases, the outgoing signals 224 may have a polarization that is shifted with respect to the incident signals 222. Thus, the incident signals 222 may include linearly polarized signals, and the outgoing signals 224 may include linearly polarized signals that have been rotated by an angle with respect to the incident signals. The polarization shift may be applied in a linear polarization basis, an elliptical or circular polarization basis, and/or in another basis. The polarization-shifted outgoing signals 224 may have substantially the same amplitude, frequency, phase, and/or propagation vector as the incident signals 222. Metamaterial particles that apply a predetermined phase shift to incident EM signals may be made from chiral materials (e.g., left-handed or right-handed materials).

As for reflection, the dispersion 220 can modify, in some implementations, the incident signals 222 by reflecting the incident signals 222 at a predefined angle. The individual metamaterial particles in the dispersion 220 may be randomly oriented with respect to each other. The angle at which incident signals 222 are reflected may be substantially independent of the orientation of the individual metamaterial particles with respect to the propagation direction of the incident signals 222. Thus, the propagation direction of the outgoing signals 224 may be directed at a predetermined angle $\alpha$ with respect to the propagation direction of the incident signals 222. For example, all incident signals 222 may be reflected at an angle of 30 degrees, 40 degrees, 90 degrees, or another angle with respect to the incident signals. The reflected outgoing signals 224 may have substantially the same amplitude, frequency, polarization, and/or phase as the incident signals 222.

Figure 3A:
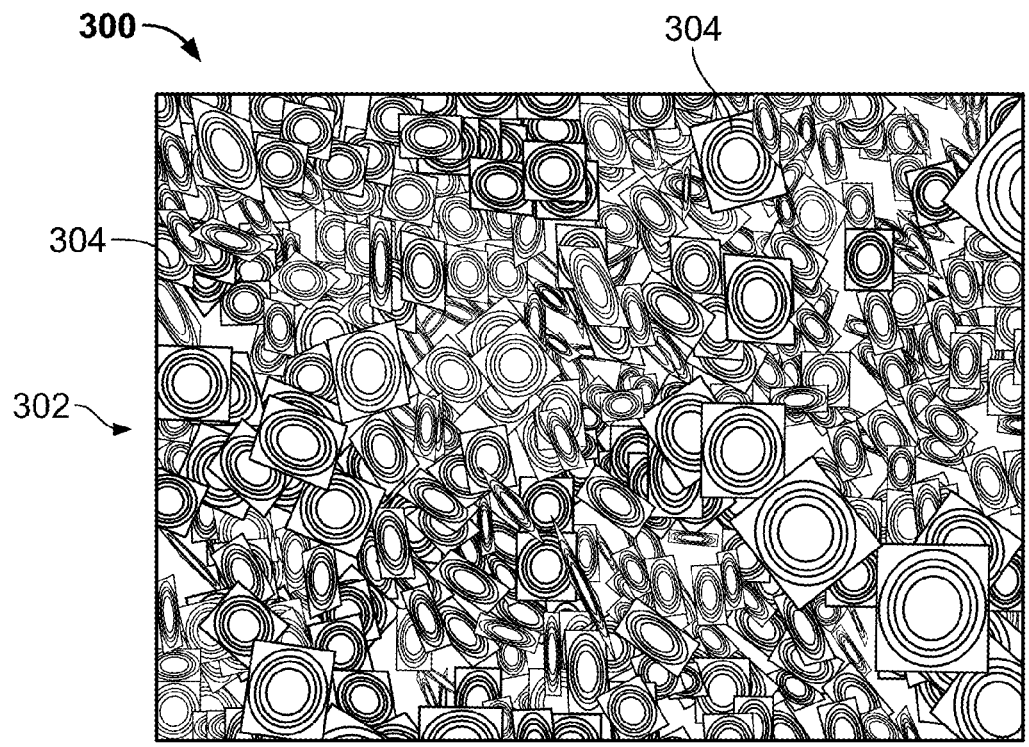
FIGS. 3A and 3B are diagrams of example dispersions of metamaterial particles.
Figure 3B:
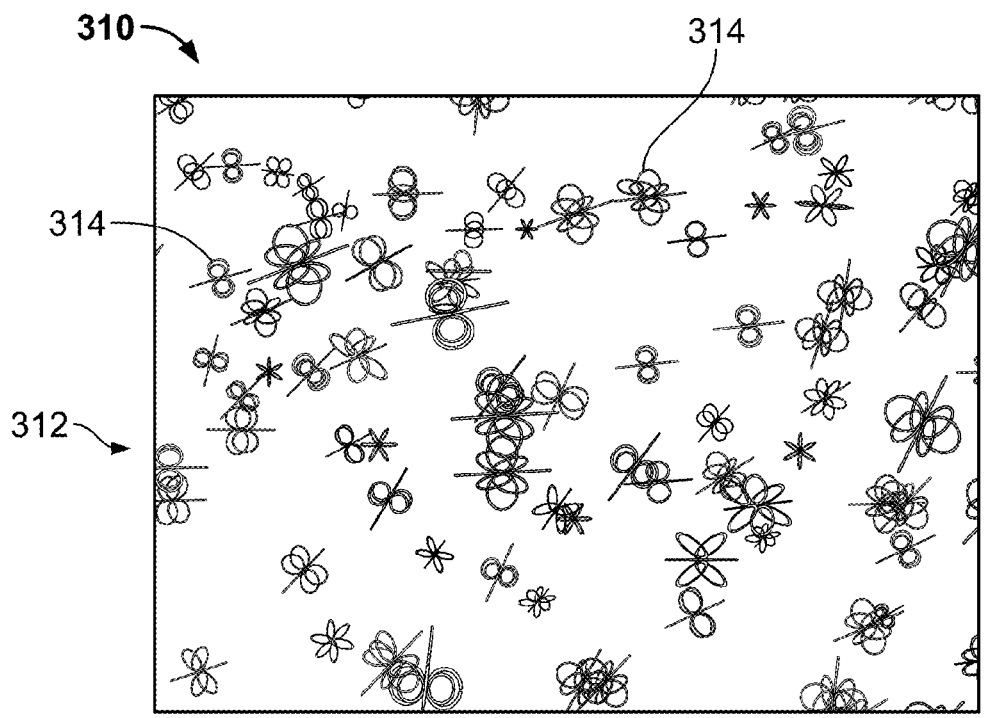

FIGS. 3A and 3B are diagrams of example dispersions of metamaterial particles. FIG. 3A shows a dispersion 300 of planar metamaterial particles 304 in an atmosphere 302. Examples of planar metamaterial particles are shown in greater detail in FIGS. 5A and 5B. FIG. 3B shows a dispersion 310 of three-dimensional metamaterial particles 314 in an atmosphere 312. An example of a three-dimensional metamaterial particle is shown in greater detail in FIG. 6. Each of the example dispersions 300, 310 include a large number of randomly-distributed, randomly-oriented individual metamaterial particles or clusters of metamaterial particles. For example, in some cases, individual metamaterial particles and/or clusters of multiple (e.g., 5, 10, 100) metamaterial particles are dispensed into the atmosphere to form the dispersion.

Generally, a dispersion of metamaterial particles in an atmosphere includes the metamaterial particles mixed with one or more fluids in the atmosphere. For example, the fluid in the atmosphere may include gas (e.g., air in the Earth's atmosphere), liquid (e.g., salt water or fresh water), plasma (e.g., in outer space), very low density fluids (e.g., near-vacuum pressures), vapor (e.g., in higher altitudes of the Earth's atmosphere), combinations of these, and/or other types of fluids. The mixture may include a suspension, a cloud, or another type of localized macrostructure. The particles may be randomly interspersed and oriented in the atmosphere. In some instances, the dispersion stays aloft for minutes, hours, or days depending on the particular properties of the particles and the atmosphere.

In an example aspect of operation, the metamaterial dispersion system 202 generates the dispersion 220 in the atmosphere 218. The incident signals 222 impinge the dispersion 220, and the dispersion 220 interacts with the incident signals 222. In some cases, as a result of the interaction between the dispersion 220 and the incident signals 222, the outgoing signals 224 are generated. The properties of the outgoing signals may be determined by the manner in which the individual metamaterial particles in the dispersion 220 interact with the incident signals 222. For example, metamaterial particles in the dispersion 220 may generate the outgoing signals 224 by applying a predefined modification to the incident signals 222. In some instances, the dispersion 220 absorbs the incident signals 222 and substantially no outgoing signals 224 are generated.

FIGS. 4A, 4B, 4C, and 4D are diagrams of example metamaterial particles. Generally, metamaterials include a class of artificial materials having an effective electric permittivity and/or magnetic permeability that may be engineered through selection of particle geometry. Such materials typically have electromagnetic responses beyond what nature provides. All materials, metamaterials included, can be classified from an electromagnetic perspective by the values of their permittivity and permeability. The terms "double positive", "epsilon negative", "mu negative" and "double negative" have been used for the classification of materials based on the signs of their electric permittivity and magnetic permeability. At microwave frequencies, some types of metamaterials have proven successful in accessing all four quadrants of the permittivity/permeability space.

Metamaterials can be specifically designed to provide highly tunable, frequency-specific absorption of electromagnetic radiation. In practice, the absorption of a metamaterial can be increased (or maximized) by decreasing (or minimizing) both the transmission and reflection of the incident wave. The reflection is substantially reduced (or minimized) by matching the impedance at the frequency of interest to that of free space, $Z(\omega)=Z_0(\omega)$, and the transmission is substantially reduced (or minimized) by increasing (or maximizing) the losses inside the metamaterial.

The frequency-dependent permittivity and permeability of a medium are fully described in terms of their real and imaginary components; $\in(\omega)=\in_1(\omega)+i\in_2(\omega)$ and $\mu(\omega)=\mu_1(\omega)+i\mu_2(\omega)$. The losses in a medium are determined by the loss tangents $\tan \delta_{\in(\omega)}=\in_2(\omega)/\in_1(\omega)$ and $\tan \delta_{\mu(\omega)}=\mu_2(\omega)/\mu_1(\omega)$. Based on these theoretical relationships, it can be seen that the absorption is maximized in theory when the loss tangents are maximized. Metamaterials offer the ability to be precisely tuned to a specific frequency or set of frequencies across a broad range of the EM spectrum.

Dipole strands that have been used in conventional systems provide coupling to the electric component of the EM field without significant coupling to the magnetic component. Metamaterial resonators can strongly couple to the electric field, the magnetic field, or both, depending on the number and configuration of capacitive and inductive elements in the metamaterial particle and depending on the symmetry of the design. Strong coupling to the magnetic field component allows metamaterial particles to interact with EM signals over a much broader range of the electromagnetic spectrum, including the visible spectrum. Because the metamaterial structures couple to both the electric and the magnetic components of the incident field, they absorb with extreme efficiency, and the absorption can be fine tuned over a broad range of frequencies.

A dispersion of metamaterial particles can, in some implementations, achieve specific spectrum control via selective absorption. For example, in some metamaterials, inherent Ohmic and dielectric losses can be exploited for the purposes of specially-designed absorbers. Experimental data suggests that EM energy is effectively absorbed and dissipated at the unit-cell level though resonant coupling of the metallic elements of a precisely designed structure.

Absorption over a broad range of frequencies by coupling to both the electric and magnetic fields may be achieved, for example, by a three-layer structure that includes an electrical component on one side of a planar dielectric substrate and a magnetic component on the opposite side of the dielectric substrate. For example, one side of the dielectric substrate can be coated with an electrically conductive pattern that interacts strongly with the electric component of the incident field but weakly with the magnetic component. The other side of the dielectric material can be coated with an electrically conductive pattern that interacts strongly with the magnetic component of the field and is called the magnetic element.

The geometry of the three layers may be designed such that the two conductive layers are strongly coupled to each other and a large field enhancement is created in the dielectric material. The resultant interaction between the metallic layers creates currents which are responsible for the absorption, via losses in both the dielectric and conductive layers. For the magnetic component on one side of the structure, it has been demonstrated that rectangular bars, crosses, and continuous films are capable of strongly coupling to the magnetic field.

The electric component determines the permittivity of the structure and may be implemented by a balanced electric ring resonator. Examples of balanced electric ring resonator structures are shown in FIGS. 4A, 4B, 4C, and 4D. It has been demonstrated that the symmetry of the balanced electric ring resonator structures interacts strongly with the electric component of the incident field, but counter propagating currents in the inductive rings prevent the resonators from coupling to the magnetic field. Concentric ring resonators ("CRR"), such as the examples shown in FIGS. 4A, 4B, 4C, and 4D, have been shown to couple strongly to incident radiation and provide phase shifting characteristics and absorption over a narrow resonance band. In a CRR, the phase delay and absorption bands can be multiplied via the addition of multiple layers of rings.

FIGS. 4A, 4B, 4C, and 4D each include a pattern diagram on the left and a corresponding circuit diagram on the right. Each pattern diagram shows an example balanced electric ring resonator structure that can be patterned on a dielectric substrate to form the electric component layer of an example metamaterial particle. The corresponding circuit diagram in each figure shows a circuit that can be used to model the balanced electric ring resonator structure. The geometry, symmetry, and material properties of each metamaterial particle may define one or more resonant frequencies for the particle. For example, there may be a particular frequency or range of frequencies of electromagnetic signals that interacts strongly with each of the metamaterial particles.

Each of the circuit diagrams in FIGS. 4A, 4B, 4C, and 4D include capacitive elements and inductive elements. In a given metamaterial particle, the capacitive elements may be the same or different (e.g., different capacitances, physical orientations, sizes, etc.), and the inductive elements may be the same or different (e.g., different inductances, orientations, sizes, etc.). Metamaterial particles may also include resistive (i.e., dissipative) components, active elements, and/or other types of components not shown in FIGS. 4A, 4B, 4C, and 4D. Moreover, the examples shown are in FIGS. 4A, 4B, 4C, and 4D are not an exhaustive set of balanced electric ring resonator structures, but are provided as examples.

The balanced electric ring resonator structure shown in the pattern diagram 400 in FIG. 4A can be modeled by the circuit shown in the circuit diagram 402. The circuit diagram 402 includes two inductive elements and a capacitive element electrically coupled in parallel. The balanced electric ring resonator structure shown in the pattern diagram 404 in FIG. 4B can be modeled by the circuit shown in the circuit diagram 408 in FIG. 4B. The circuit diagram 404 includes four inductive elements and two capacitive elements. The four inductive elements are coupled to each other in parallel. The two of the capacitive elements are connected in parallel with two of the inductive elements, and the two capacitive elements are connected in series with the other two inductive elements. The balanced electric ring resonator structure shown in the pattern diagram 410 in FIG. 4C can be modeled by the circuit shown in the circuit diagram 412 in FIG. 4C. The circuit diagram 412 includes two capacitive elements and an inductive element electrically coupled in parallel. The balanced electric ring resonator structure particle shown in the pattern diagram 414 in FIG. 4D can be modeled by the circuit shown in the circuit diagram 416 in FIG. 4D. The circuit diagram 402 includes four inductive elements and four capacitive elements in a bridge circuit configuration.

Figure 5A:
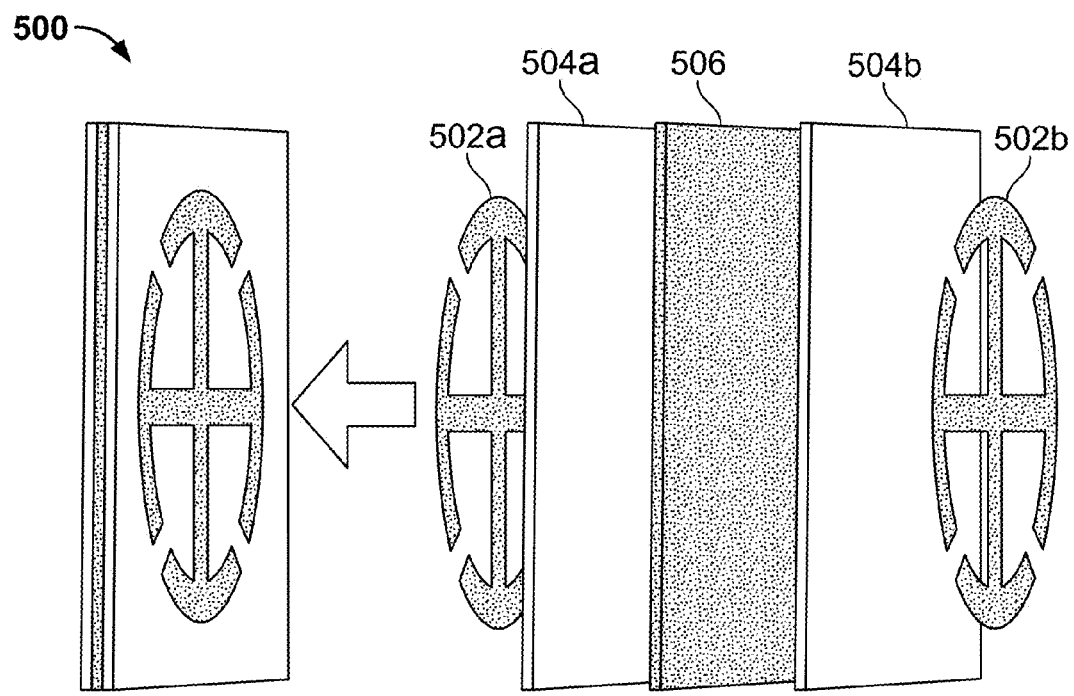
FIGS. 5A and 5B are diagrams of example metamaterial particles.
Figure 5B:
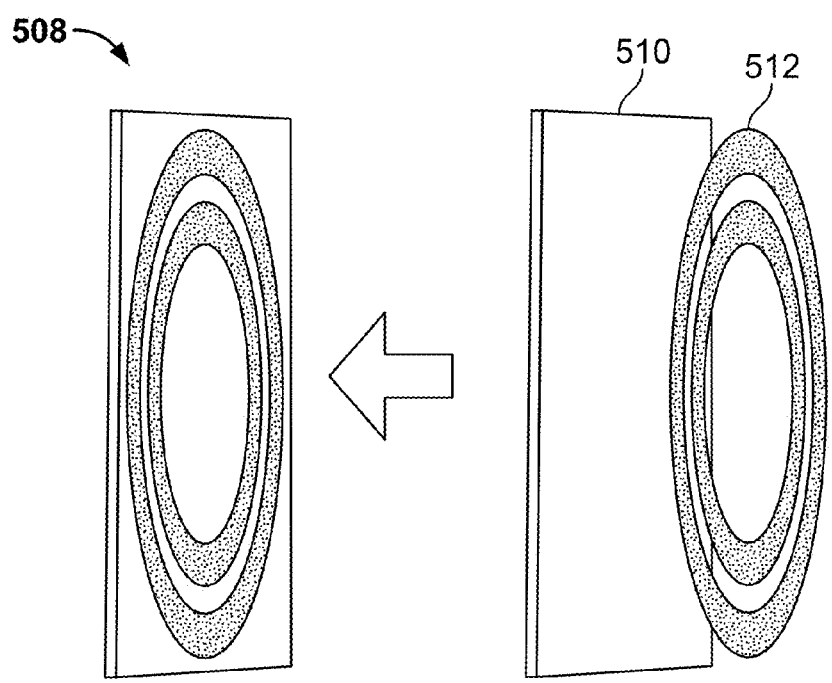

FIGS. 5A and 5B are diagrams of example metamaterial particles 500, 508. Both of the example particles 500, 508 include an electric ring resonator patterned onto a thin, lightweight dielectric material, such as Kapton, cellulose, or another type of dielectric material. The example metamaterial particles include one-sided or two-sided two-dimensional metallic patterns (e.g., copper, gold or silver) that can be printed onto the dielectric materials via conventional flexible lithography techniques. The example metamaterial particle 500 in FIG. 5A is two-sided structure formed from the five layers shown in the diagram. The example metamaterial particle 508 in FIG. 5B is a one-sided structure formed from the two layers shown in the diagram.

The example particle 500 shown in FIG. 5A is a bi-directional metamaterial particle that includes two electric ring resonator layers 502a, 502b, two dielectric layers 504a, 504b, and a middle conductive layer 506. The conductive layer 506 may be a continuous conductive layer that is thicker than the skin depth. In some implementations, one or more layers may be omitted. For example, the conductive layer and/or one of the dielectric layers may be omitted in some cases. The example particle 508 shown in FIG. 5B is a bi-directional metamaterial particle that includes a concentric ring resonator 512 patterned onto a dielectric layer 510. The example particle 508 may apply a predetermined phase-shift to incident EM signals and/or apply a substantial attenuation to the incident EM signals (e.g., by absorption).

FIG. 6 is a diagram of an example three-dimensional metamaterial particle. Three different views 600a, 600b, and 600c of the particle are shown in FIG. 6. Such three-dimensional, space-filling elements are more effective than two-dimensional particles in certain circumstances. The three-dimensional particles may be stored in a collapsed position. After the particles are dispensed, the particles may expand to the three-dimensional structure shown in FIG. 6. Additional and/or different types of three-dimensional particles may be used. In some instances, multiple different types of metamaterial particles are combined to form a single dispersion. For example, two-dimensional and three-dimensional particles may be used together.

Figure 8:
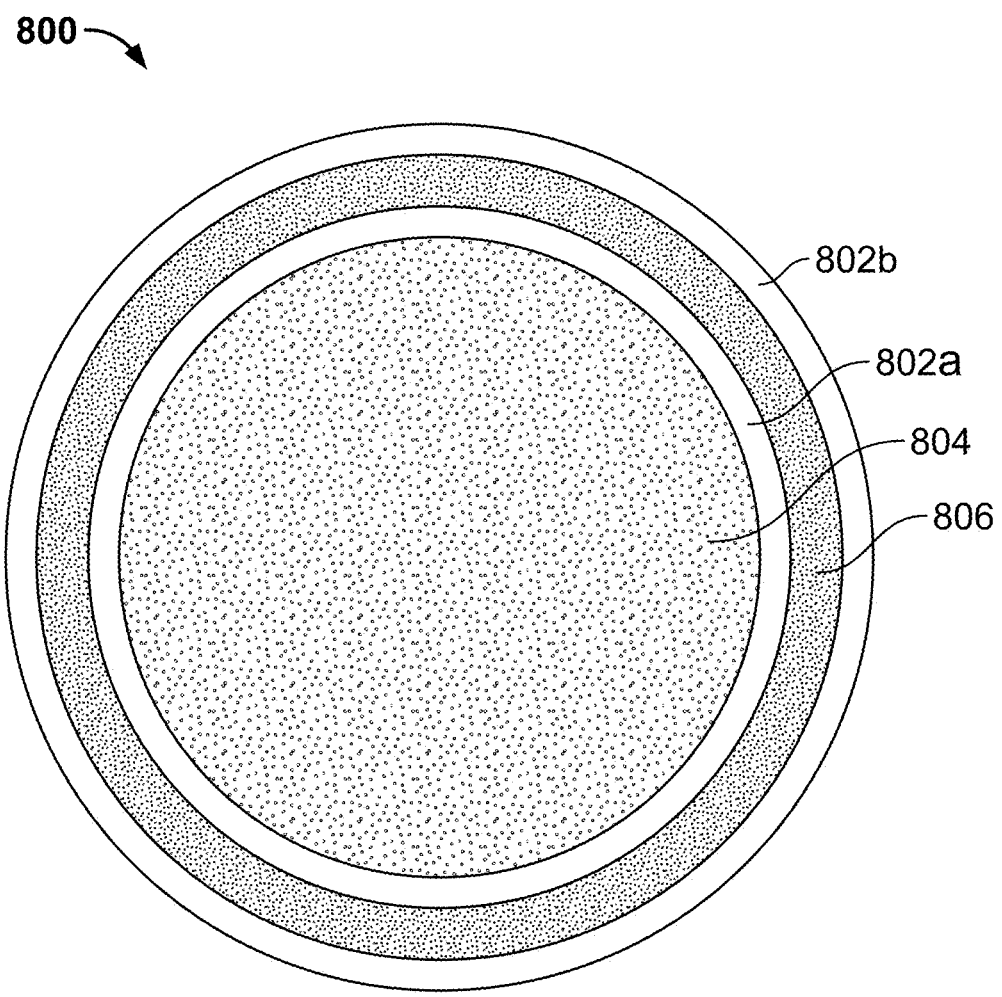
FIG. 8 a diagram of an example metamaterial particle.

FIG. 8 a diagram of an example metamaterial particle 800. The example metamaterial particle 800 includes a Concentric Shell Resonator (CSR) nanostructure. In particular, FIG. 8 shows a cross-sectional view of a geometrically-tunable narrow-band electromagnetic-signal-absorbing spherical CSR. The metamaterial particle 800 may be adapted to absorb visible electromagnetic frequencies, infrared electromagnetic frequencies and/or other electromagnetic frequencies. As such, in some implementations, a dispersion of multiple particles such as the particle 800 in FIG. 8 may be used as an obscurant. Additionally or alternatively, the metamaterial particle 800 may be used in a different manner. The geometry of the particle 800 may be adjusted to control the electromagnetic frequencies absorbed by the particle 800.

The example CSR nanostructure of the particle 800 exhibits Electromagnetically Induced Transparency (EIT) and narrow-band absorption. The CSR nanostructure includes alternating layers of dielectric and metallic materials. As shown in FIG. 8, the example particle 800 includes an inner dielectric core 804, an inner metallic layer 802a about the dielectric core 804, an intermediate dielectric layer 806 about the inner metallic layer 802a, and an outer metallic layer 802b about the intermediate dielectric layer 806. The electromagnetic behavior of the CSR structure can be tuned by altering the geometric proportions of the various layers and/or the permittivity of the dielectric material. For example, the core diameter, the metallic layer thicknesses and the dielectric layer thickness may be manipulated to specify the manner in which the particle 800 interacts with electromagnetic signals. In some instances, the spacing between the metallic layers determines the bandwidth of the electromagnetic response of the particle 800.

FIG. 7 is a flow chart showing an example process 700 for using a dispersion of metamaterial particles to modify electromagnetic signals. For example, the process 700 may be used to form a chaff or obscurant cloud that absorbs and/or modifies electromagnetic signals in an atmosphere, or the process 700 may be used to form a different type of dispersion. The dispersion of metamaterial particles may be formed in an aqueous, gaseous, vapor, vacuum, plasma, or other type of atmosphere. For example, the dispersion may be formed in the Earth's atmosphere over a geographic area, in a body of water, or in another type of environment. One or more operations of the process 700 may be implemented by a metamaterial dispersion system, such as the metamaterial dispersion system 202 shown in FIG. 2. In some implementations, the process 700 may function as part of an electronic countermeasure, to avoid radar detection, to suppress or disrupt communications, and/or for other purposes. In some implementations, the process 700 may function as part of an obscurant system. The operations of the process 700 may be carried out by a single system and/or by a multiple subsystems in one or more common or distributed locations. In some implementations, the process 700 may include additional, fewer, and/or different operations performed in the same or a different order. One or more operations of the process 700 may be modified, omitted, or iterated as appropriate in various circumstances.

At 702, metamaterial particles are identified. For example, the metamaterial particles may be identified by selecting a cartridge or another type of element that carries the metamaterial particles. The metamaterial particles may be identified by identifying a location and/or status of the metamaterial particles. At 704, the metamaterial particles are dispensed into an atmosphere. For example, a cartridge or other carrier element that carries the metamaterial particles may be released, launched, opened, or otherwise actuated to dispense the metamaterial particles from the carrier element. In some implementations, the metamaterial particles are carried in a grenade, and the metamaterial particles are dispensed into the atmosphere when the grenade explodes. The grenade may be deployed by hand, by a grenade rifle, a grenade launcher, or another type of grenade deployment platform. In some cases, the metamaterial particles may be dispensed into the slipstream of an aircraft, into the wake of a watercraft, or into the atmosphere above a geographic region. In the atmosphere, the metamaterial particles form a dispersion. The dispersion may include a cloud, a suspension, or another type of localized macrostructure where the particles are interspersed within one or more fluids (e.g., gas, liquid, plasma, vapor, combinations, etc.) in the atmosphere.

At 706, the dispersion of metamaterial particles interacts with electromagnetic signals in the atmosphere. For example, the dispersion may substantially attenuate or completely absorb electromagnetic signals incident on the particles in the dispersion. In some implementations, the dispersion absorbs visible frequencies. For example, the dispersion may obscure visibility of one or more objects, people, or systems in a theater of operation. In some implementations, the dispersion may act as an IR obscurant, for example, that absorbs blackbody thermal emissions. For example, the dispersion of metamaterial particles may absorb blackbody thermal emissions in the infrared electromagnetic frequency range. In some implementations, the dispersion absorbs other electromagnetic signal frequencies.

The dispersion may modify the group properties of the electromagnetic signals in the atmosphere while preserving, or substantially preserving, the amplitudes of the signals. For example, the dispersion may apply a phase shift to the signals, apply a polarization shift to the signals, reflect the signals at a particular angle or range of angles, apply a frequency shift to the signals, or apply some other type of modification. Such modifications may be applied globally, in the substantially same manner to all of the electromagnetic signals that interact with the dispersion in the atmosphere. The electromagnetic signal modifications may be implemented, in some cases, without significantly attenuating or absorbing the electromagnetic signals. Alternatively or additionally, the electromagnetic signal modifications may be implemented, in some cases, while attenuating or absorbing some portion of the electromagnetic signals.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
    identifying a plurality of metamaterial particles, each metamaterial particle interacts with an electric component and a magnetic component of electromagnetic signals to absorb the electromagnetic signals; and
    dispensing the plurality of metamaterial particles into a fluid medium in an atmosphere, the plurality of metamaterial particles being mobile within the fluid medium and forming a transient dispersion that absorbs electromagnetic signals in the atmosphere.

2. The method of claim 1, the metamaterial particles absorb electromagnetic signals having one or more frequencies in a frequency range ranging from radio frequencies to infrared frequencies.

3. The method of claim 1, the dispersion absorbs infrared frequency electromagnetic signals in the atmosphere.

4. The method of claim 1, the dispersion absorbs radio frequency electromagnetic signals in the atmosphere.

5. The method of claim 1, the dispersion absorbs millimeter wave frequency electromagnetic signals in the atmosphere.

6. The method of claim 1, the dispersion absorbs microwave frequency electromagnetic signals in the atmosphere.

7. The method of claim 1, the dispersion absorbs ultraviolet frequency electromagnetic signals in the atmosphere.

8. The method of claim 1, the dispersion absorbs visible frequency electromagnetic signals in the atmosphere.

9. The method of claim 1, identifying the plurality of metamaterial particles comprises identifying a container that contains the plurality of particles.

10. The method of claim 1, the atmosphere comprises a region in the Earth's atmosphere.

11. The method of claim 1, the atmosphere comprises a region of outer space outside the Earth's atmosphere.

12. The method of claim 1, the atmosphere comprises a region in a body of water.

13. The method of claim 1, the dispersion absorbs electromagnetic signals in a particular frequency range associated with a telecommunication system.

14. The method of claim 1, the dispersion absorbs electromagnetic signals in a particular frequency range associated with a global positioning system.

15. The method of claim 1, the dispersion absorbs electromagnetic signals in a particular frequency range associated with a radar system.

16. The method of claim 1, the dispersion absorbs electromagnetic signals in a particular frequency range associated with blackbody thermal emissions.

17. The method of claim 1, each of the metamaterial particles comprises a layered structure that includes an electric layer and a magnetic layer, the electric layer interacts with the electric component of the electromagnetic signals, the magnetic layer interacts with the magnetic component of the electromagnetic signals.

18. The method of claim 17, the layered structure further comprising a dielectric layer between the electric layer and the magnetic layer.

19. The method of claim 1, each of the metamaterial particles comprises a layered structure that includes a balanced electric ring resonator structure.

20. The method of claim 1, each of the metamaterial particles comprises a concentric shell resonator structure.

21. The method of claim 20, the concentric shell resonator structure comprising an outer conductive shell, and an inner conductive shell within the outer conductive shell.

22. The method of claim 21, the concentric shell resonator structure further comprising:

a dielectric layer between the inner conductive shell and the outer conductive shell; and an inner dielectric core within the inner conductive shell.

23. The method of claim 1, the metamaterial particles absorb electromagnetic signals having one or more frequencies in a frequency range ranging from radio frequencies to ultraviolet frequencies.

24. The method of claim 1, comprising using the transient dispersion of metamaterial particles as an electronic countermeasure against a threat.

25. The method of claim 1, wherein the fluid medium comprises a gaseous medium.

26. A method comprising:

identifying a plurality of metamaterial particles, each metamaterial particle interacts with an electric component and a magnetic component of electromagnetic signals incident on the metamaterial particle to apply a predefined modification to the electromagnetic signals, the predefined modification comprising at least one of a predefined phase shift, a predefined frequency shift, a predefined polarization shift, or a reflection at a predefined angle; and dispensing the plurality of metamaterial particles into a fluid medium in an atmosphere, the plurality of metamaterial particles being mobile within the fluid medium and forming a transient dispersion in the atmosphere, the dispersion modifies one or more properties of incident electromagnetic signals in the atmosphere to generate output electromagnetic signals having the predefined modification.

27. The method of claim 26, the dispersion modifies the one or more properties of radio frequency electromagnetic signals.

28. The method of claim 26, the dispersion modifies the one or more properties of infrared frequency electromagnetic signals.

29. The method of claim 26, the dispersion modifies the one or more properties of visible frequency electromagnetic signals.

30. The method of claim 26, the dispersion modifies the one or more properties of ultraviolet frequency electromagnetic signals.

31. The method of claim 26, the dispersion modifies the one or more properties of millimeter wave frequency electromagnetic signals.

32. The method of claim 26, the dispersion modifies the one or more properties of electromagnetic signals in a frequency range associated with a telecommunication system.

33. The method of claim 26, the dispersion modifies the one or more properties of electromagnetic signals in a frequency range associated with a global positioning system.

34. The method of claim 26, the dispersion modifies the one or more properties of electromagnetic signals in a frequency range associated with a radar defense system.

35. A system comprising:

a carrier element including a plurality of metamaterial particles, each metamaterial particle includes:

a magnetic element configured to interact with a magnetic component of an electromagnetic signal; and an electric element configured to interact with an electric component of the electromagnetic signal; and a dispenser that dispenses the metamaterial particles from the carrier element into a fluid medium in an atmosphere, the plurality of metamaterial particles being mobile within the fluid medium and forming a transient dispersion in the atmosphere.

36. The system of claim 35, the system comprising an aircraft that houses the carrier element and the dispenser, the dispenser dispenses the metamaterial particles into an airspace associated with the aircraft.

37. The system of claim 35, the system comprising a spacecraft that houses the carrier element and the dispenser, the dispenser dispenses the metamaterial particles into outer space.

38. The system of claim 35, the system comprising a marine vessel that houses the carrier element and the dispenser, the dispenser dispenses the metamaterial particles into a body of water associated with the marine vessel.

39. The system of claim 35, the system comprising a terrestrial installation that houses the carrier element and the dispenser, the dispenser dispenses the metamaterial particles into an airspace associated with the terrestrial installation.

40. The system of claim 35, the system comprising a grenade system that includes the carrier element and the dispenser.

41. The system of claim 35, each of the metamaterial particles has at least one of a negative electric permittivity, zero electric permittivity, negative magnetic permeability, or zero magnetic permeability.

42. The system of claim 35, each of the metamaterial particles has at least one of zero index of refraction or negative index of refraction.

43. The system of claim 35, each of the metamaterial particles includes at least one of a metallic inclusion, pyroelectric material, pyrophoric material, ferroelectric material, semiconductor material, a lanthanide series element, a quantum dot, an organic dye, a carbon nanotube, or a graphene sheet.

* * * * *